Sept. 2, 1947.     E. H. LANGLEY     2,426,938
HYDRAULIC STEERING GEAR
Filed Nov. 23, 1945     2 Sheets-Sheet 2
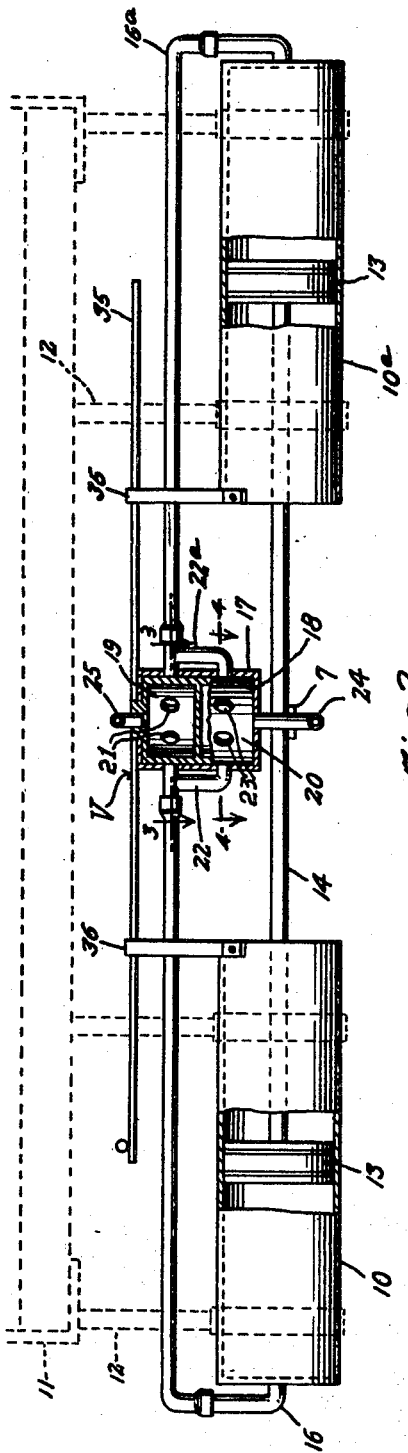
Inventor
Ervin Howard Langley Patented Sept. 2, 1947

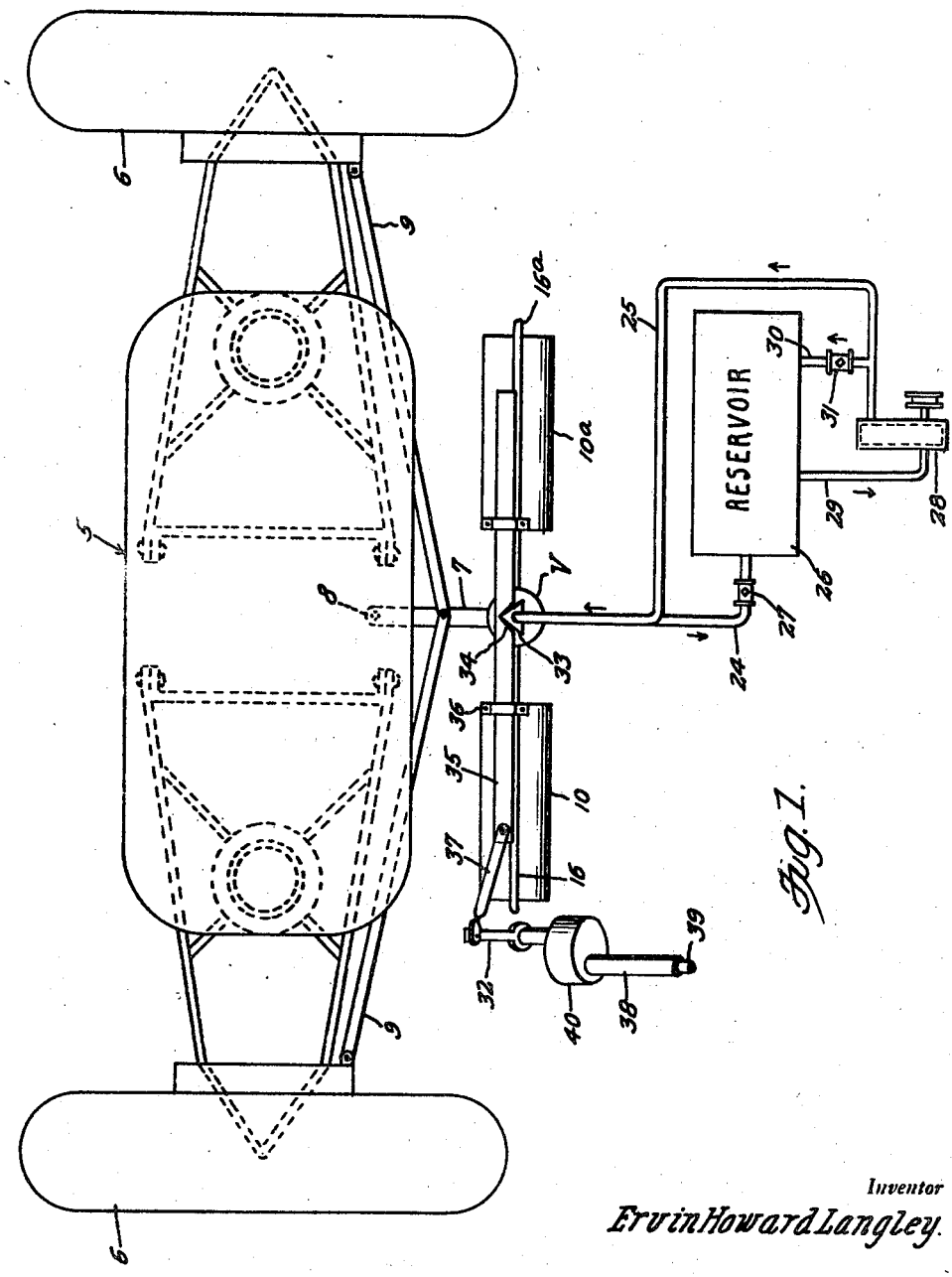

2,426,938

UNITED STATES PATENT OFFICE 2,426,938

HYDRAULIC STEERING GEAR

Ervin Howard Langley, Shamrock, Tex.

Application November 23, 1945, Serial No. 630,504

2 Claims. (Cl. 180—79.2)

This invention relates to an improved hydraulic steering gear for motor vehicles wherein a power-operated pump is employed for creating hydraulic pressure to cause steering in a selected direction under the manual control of the operator.

The present invention contemplates a hydraulic steering gear of the above kind in which spaced, single-acting fluid pressure motors are mounted in alignment transversely of the vehicle and have their pistons connected by a common piston rod which is operatively connected to the front steering wheels of the vehicle.

An important object of the present invention is to provide a novel form of valve and operating means therefor, for controlling the flow of pressure fluid to and from the fluid pressure motors, whereby steering of the vehicle may be conveniently and effectively controlled by operation of the usual steering shaft of the steering column or post of the motor vehicle.

The present invention further resides in the novel form, combination and arrangement of parts hereinafter more fully described, shown in the accompanying drawings, and claimed.

In the drawings:

Figure 1 is a plan view of part of a motor vehicle chassis equipped with a steering gear embodying the present invention, Figure 2 is an enlarged view partly in rear elevation and partly in vertical section showing the fluid pressure motors and the control valve, Figure 3 is an enlarged fragmentary horizontal section taken on line 3—3 of Figure 2, Figure 4 is a view similar to Figure 3, taken on line 4—4 of Figure 2, and Figure 5 is a fragmentary enlarged plan view showing the connection between the piston rod of the fluid pressure motors and the actuating lever which is connected to the front steering wheel of the vehicle.

Referring in detail to the drawings, a conventional type of front axle assembly for tractors and other heavy vehicles is generally indicated at 5, such assembly being of the type wherein the front wheels 6 are turned, in steering, about pivots located in the planes of said wheels. In this type of construction, a horizontally-swinging actuating lever 7 is pivoted to the frame of the assembly 5, as at 8, and is operatively connected with the hubs of wheels 6 by links 9. The arrangement is such that when the lever 7 is swung to the right, the wheels 6 are turned to steer the vehicle to the left, and vice versa.

In accordance with the present invention, the cylinders 10 and 10a of two single-acting fluid pressure motors are rigidly mounted in spaced relation and in alignment transversely of the vehicle rearwardly of the assembly 5. As shown in Figure 2, this may be done by rigidly mounting the cylinders 10 and 10a on the chassis frame 11 of the vehicle so as to be suspended from said frame by suitable hangers or supports 12. Each fluid pressure motor includes a piston 13 reciprocable in the associated cylinder, and these pistons are connected by a common piston rod 14 which is operatively connected intermediate the cylinders 10 and 10a to the free rear end of lever 7 by a pin and slot connection 15, as shown in Figure 5.

The fluid pressure motors are oppositely acting and therefore are supplied with fluid under pressure at their outer ends through pipes 16 and 16a.

Flow of the pressure fluid to and from the respective cylinders 10 and 10a is controlled by means of a valve V arranged intermediate the cylinders 10 and 10a. This valve includes a casing 17 having a rotatable valve member 18 therein, which valve member is provided with non-communicating upper and lower chambers 19 and 20. The pipes 16 and 16a communicate with opposite sides of the casing 17 in the same plane as ports 21 provided in the wall of the chamber 19, and said pipes 16 and 16a have branches 22 and 22a which communicate with opposite sides of the casing 17 in the same plane as ports 23 provided in the wall of the chamber 20. The ports 21 and 23 are so arranged that when a port 21 is registered with pipe 16, the other port 21 is out of registry with pipe 16a and a port 23 is registered with the branch 22a of pipe 16a while the other port 23 is out of registry with the branch 22 of pipe 16. The arrangement is further such that when a port 21 is registered with pipe 16a, the other port 21 is out of registry with pipe 16, and a port 23 is registered with branch 22 of pipe 16 while the other port 23 is out of registry with the branch 22a of pipe 16a. An outlet pipe 24 constantly communicates with chamber 20 through the bottoms of the casing 17 and valve member 18, while an inlet pipe 25 constantly communicates with the chamber 19 through the tops of the casing 17 and valve member 18. It will thus be apparent that the valve member 18 may be turned to either supply fluid under pressure to the cylinder 10 and simultaneously exhaust the pressure fluid from the cylinder 10a, or to supply fluid under pressure to the cylinder 10a and simultaneously exhaust the pressure fluid from the cylinder 10. Actuation of the piston 13 of cylinder 10 will thus cause steering of the vehicle to the left, while actuation of the piston 13 of the cylinder 10a will cause steering of the vehicle to the right.

As shown in Figure 1, the outlet pipe 24 communicates with a reservoir 26 for the pressure fluid and is provided with a check valve 27 so as to prevent passage of the fluid from the reservoir to the chamber 20. The inlet pipe 25 communicates with the outlet of a power-operated pump 28 whose inlet is connected by a pipe 29 with the reservoir 26. A by-pass connection 30 is provided between the pipe 25 and the reservoir 26 and has a pressure relief valve 31 interposed therein so that when the pressure in the pipe or line 25 reaches a predetermined point, the fluid will be by-passed from the pump back to the reservoir to avoid generation of excess pressure in the pipe or line 25. Obviously, the pump 28 may be suitably driven from the engine of the vehicle and driving of said pump may be under the control of the operator of the vehicle, as is generally well known in the art.

The valve member 18 is operatively connected to the steering arm 32 which is usually connected by a drag link with the lever 7. For this purpose, the valve member 18 is provided at the top with a substantially triangular, relatively short stem 33 which is received within a substantially V-shaped notch 34 provided in an edge and intermediate the ends of an operating rod 35 which is slidably mounted in guides 36 for longitudinal movement transversely of the vehicle. One end of the rod 35 is connected with the steering arm 32 by a link 37, and it will thus be seen that when the rod 35 is shifted to the right, the valve member 18 is turned in a clockwise direction as viewed in Figures 1, 3 and 4 so as to simultaneously supply pressure fluid to cylinder 10a and exhaust the same from the cylinder 10. It will further be seen that when the rod 35 is moved to the left, the valve member 18 is reversely rotated for admitting the pressure fluid to the cylinder 10 and exhausting it from the cylinder 10a. The vehicle has the usual steering post or column 38 in which is journaled a steering shaft 39 which may carry the usual steering handle or wheel at its upper end and which is operatively geared at its lower end within a gear box 40 with the steering arm 32. As shown, the gearing in gear box 40 is of a character to effect movement of rod 35 to the right for a right turn and to the left for a left turn.

In operation, the steering shaft 39 may be operated to completely close the valve V as shown in Figures 2, 3 and 4 when the wheels 6 have been turned to the desired degree, thereby preventing further turning of the wheels and maintaining them in the position to which they have been turned. When the desired turning movement of the vehicle has been completed, the wheels 6 may be returned to normal position by actuation of the piston in the proper cylinder, whereupon the wheels 6 may be maintained in position to travel straight ahead by again closing the valve V. While the same has not been shown and as is old in the art, spring means may be utilized to normally yieldingly position the piston 13 in a position wherein the wheels 6 are turned for straight-ahead travel, as illustrated in Figure 1.

From the foregoing description, it is believed that the construction and operation, as well as the advantages of the present invention, will be readily understood and appreciated by those skilled in the art. The apparatus is simple and compact in construction, easy to install, convenient to control, and efficient in operation. Minor changes may be made in the details illustrated and described, such as fall within the scope of the invention as claimed.

What I claim is:

1. In a hydraulic steering gear for a motor vehicle, wherein front steering and supporting wheels are mounted on a front axle assembly to turn about vertical axes, wherein an operating lever is pivoted at its front end on a frame of the assembly for horizontal swinging movement, wherein a steering arm is actuated by a steering shaft, and wherein said lever is operatively connected intermediate its ends with the wheels by means of links, two single-acting fluid pressure motors rigidly mounted on the frame of the vehicle rearwardly of said assembly and disposed in alignment transversely of the vehicle, said motors including cylinders and pistons reciprocable in said cylinders and connected by a common piston rod, means operatively connecting the rear end of said lever to said piston rod intermediate the cylinders, a valve for controlling the flow of pressure fluid to and from the respective cylinders, said valve being mounted in a fixed position between the cylinders and including a rotatable valve member, an actuating rod for said valve member mounted for longitudinal sliding movement above the cylinders transversely of the vehicle, and means to connect an end of said actuating rod to the steering arm of the vehicle.

2. The construction defined in claim 1, wherein said valve member has a triangular stem, said actuating rod having a notch in an edge thereof receiving said stem so that longitudinal movement of the rod will effect turning of the valve member.

ERVIN HOWARD LANGLEY.

REFERENCES CITED

The following references are of record in the file of this patent:

UNITED STATES PATENTS

| Number | Name | Date |
| --- | --- | --- |
| 1,914,267 | Leupold | June 13, 1933 |
| 1,657,412 | Schneider | Jan. 24, 1928 |
| 2,363,179 | Harrington et al. | Nov. 21, 1944 |